United States Patent
Fujishiro et al.

(10) Patent No.: US 10,476,694 B2
(45) Date of Patent: Nov. 12, 2019

(54) BASE STATION AND USER TERMINAL, FOR TRANSMITTING AND RECEIVING MULTICAST DATA USING SEMI-PERSISTENT SCHEDULING

(71) Applicant: KYOCERA CORPORATION, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 79 days.

(21) Appl. No.: 15/545,887

(22) PCT Filed: Jan. 25, 2016

(86) PCT No.: PCT/JP2016/051964
§ 371 (c)(1),
(2) Date: Jul. 24, 2017

(87) PCT Pub. No.: WO2016/121671
PCT Pub. Date: Aug. 4, 2016

(65) Prior Publication Data
US 2018/0026803 A1 Jan. 25, 2018

Related U.S. Application Data

(60) Provisional application No. 62/110,045, filed on Jan. 30, 2015.

(51) Int. Cl.
*H04W 4/06* (2009.01)
*H04L 12/18* (2006.01)
(Continued)

(52) U.S. Cl.
CPC ............ *H04L 12/189* (2013.01); *H04W 4/06* (2013.01); *H04W 4/08* (2013.01); *H04W 8/18* (2013.01);
(Continued)

(58) Field of Classification Search
CPC .... H04L 12/189; H04W 72/005; H04W 4/08; H04W 72/1273; H04W 8/18; H04W 4/06;
(Continued)

(56) References Cited

U.S. PATENT DOCUMENTS

2011/0013574 A1* 1/2011 Hsu ..................... H04W 72/005
370/329
2011/0188461 A1* 8/2011 Lee ....................... H04L 1/0025
370/329
(Continued)

FOREIGN PATENT DOCUMENTS

CN 103167420 A * 6/2013

OTHER PUBLICATIONS

International Search Report issued in PCT/JP2016/051964; dated Apr. 12, 2016.
(Continued)

*Primary Examiner* — Salvador E Rivas
*Assistant Examiner* — Lalita W Pace
(74) *Attorney, Agent, or Firm* — Studebaker & Brackett PC (57) ABSTRACT

A base station according to a first aspect manages a cell in which a group including a plurality of user terminals exists. The base station comprises: a controller configured to instruct, if starting transmission of multicast data to the plurality of user terminals, each of the plurality of user terminals to activate a semi-persistent scheduling; and a transmitter configured to use the semi-persistent scheduling to transmit the multicast data to the plurality of user terminals via a physical downlink shared channel.

8 Claims, 6 Drawing Sheets

(51) Int. Cl.
  *H04W 8/18* (2009.01)
  *H04W 72/12* (2009.01)
  *H04W 4/08* (2009.01)
  *H04W 72/00* (2009.01)
  *H04W 76/27* (2018.01)
  *H04W 88/08* (2009.01)

(52) U.S. Cl.
  CPC ..... *H04W 72/005* (2013.01); *H04W 72/1273* (2013.01); *H04W 76/27* (2018.02); *H04W 88/08* (2013.01)

(58) Field of Classification Search
  CPC ... H04W 88/08; H04W 76/27; H04W 72/042; H04W 72/121; H04W 72/1263; H04W 72/1289
  See application file for complete search history.

(56) References Cited

U.S. PATENT DOCUMENTS

| | | | |
|---|---|---|---|
| 2012/0082119 A1* | 4/2012 | Chung | H04B 7/06 370/329 |
| 2012/0155416 A1* | 6/2012 | Zhang | H04W 72/04 370/329 |
| 2014/0092829 A1* | 4/2014 | Han | H04L 5/0035 370/329 |
| 2014/0161069 A1* | 6/2014 | Ohta | H04W 72/1263 370/329 |
| 2014/0348050 A1* | 11/2014 | Kim | H04L 5/0082 370/312 |
| 2015/0289268 A1* | 10/2015 | Ohta | H04W 4/04 370/336 |
| 2016/0205683 A1* | 7/2016 | Quan | H04W 16/10 370/280 |
| 2016/0227517 A1* | 8/2016 | Han | H04W 72/04 |
| 2017/0208612 A1* | 7/2017 | Tushar | H04W 88/08 |

OTHER PUBLICATIONS

Huawei et al.; New Study Item Proposal for Support of single-cell point-to-multipoint transmission in LTE; 3GPP TSG RAN Meeting #66; RP-142205; Dec. 8-11, 2014; pp. 1-6; Maui, Hawaii, USA.

* cited by examiner

BASE STATION AND USER TERMINAL, FOR TRANSMITTING AND RECEIVING MULTICAST DATA USING SEMI-PERSISTENT SCHEDULING

TECHNICAL FIELD

The present application relates to a base station and a user terminal in a mobile communication system.

BACKGROUND ART

In 3GPP (Third Generation Partnership Project), which is a project aiming to standardize a mobile communication system, the specifications of Multimedia Broadcast Multicast Service (MBMS), as a technology for realizing multicast/broadcast transmission, have been laid down.

In the MBMS, a plurality of cells use a special subframe called a Multicast-Broadcast Single-Frequency Network (MBSFN) subframe, and a plurality of cells belonging to an identical MBSFN area transmit identical multicast/broadcast data. A user terminal receives the multicast/broadcast data transmitted from a plurality of cells.

In the MBMS, in addition to the MBSFN subframe being used for the MBMS, it is difficult to dynamically change the MBSFN subframe, and thus, a radio resource may not be effectively used.

On the other hand, in order to realize multicast transmission while increasing utilization efficiency of a radio resource, a Single-Cell Point-To-Multipoint (SCPTM) transmission has been discussed. Unlike the MBMS where multicast/broadcast transmission is applied per MBSFN area, in the SCPTM, the multicast transmission is applied per cell. Further, in the SCPTM, it is assumed that a physical downlink shared channel (PDSCH) is used for transmitting multicast data for a plurality of user terminals.

PRIOR ART DOCUMENT

Non-Patent Document

Non Patent Document 1: 3GPP contribution "RP-142205"

SUMMARY OF THE INVENTION

A base station according to a first aspect manages a cell in which a group including a plurality of user terminals exists. The base station comprises: a controller configured to instruct, if starting transmission of multicast data to the plurality of user terminals, each of the plurality of user terminals to activate a semi-persistent scheduling; and a transmitter configured to use the semi-persistent scheduling to transmit the multicast data to the plurality of user terminals via a physical downlink shared channel.

A user terminal according to a second aspect belongs to a group including a plurality of user terminals. The use terminal comprises: a controller configured to activate a semi-persistent scheduling, if receiving, from a base station, an activation instruction for the semi-persistent scheduling; and a receiver configured to use the semi-persistent scheduling to receive multicast data transmitted from the base station to the plurality of user terminals via a physical downlink shared channel.

DESCRIPTION OF THE EMBODIMENT

Overview of Embodiment

A radio resource allocation on a PDSCH is typically a dynamic scheduling via a physical downlink control channel (PDCCH). Specifically, for each allocation on a PDSCH in a subframe, scheduling information is transmitted to a user terminal via a PDCCH in the subframe.

However, scheduling may become complicated if such dynamic scheduling is applied to the SCPTM.

Therefore, an object of the present application is to provide a base station and a user terminal by which it is possible to allow for efficient scheduling when multicast transmission to a plurality of user terminals is performed.

A base station according to a first embodiment and a second embodiment manages a cell in which a group including a plurality of user terminals exists. The base station comprises: a controller configured to instruct, if starting transmission of multicast data to the plurality of user terminals, each of the plurality of user terminals to activate a semi-persistent scheduling; and a transmitter configured to use the semi-persistent scheduling to transmit the multicast data to the plurality of user terminals via a physical downlink shared channel.

In the first embodiment, the activation is instructed via the physical downlink control channel, and the controller repeatedly instructs the user terminal in the group to perform the activation.

In the first embodiment, the controller instructs the user terminal in the group to perform the activation, even after starting transmitting the multicast data.

In the first embodiment, the controller regularly instructs the user terminal in the group to perform the activation.

In the second embodiment, the transmitter transmits a message including configuration information about a configuration of the semi-persistent scheduling. The controller includes, if transmitting the message, activation notification information indicating that the semi-persistent scheduling is activated, into the message.

In the second embodiment, the controller includes, if transmitting the message after instructing each of the plurality of user terminals to perform the activation of the semi-persistent scheduling, the activation notification information, into the message.

In the second embodiment, the message is a broadcast RRC message, an individual RRC message, or a MAC message.

In the second embodiment, the base station comprising: a receiver configured to receive, from a user terminal, an interest notification about an interest in receiving the multicast data. The transmitter transmits, to the user terminal, the message including the activation notification information, if receiving the interest notification after instructing each of the plurality of user terminals to activate the semi-persistent scheduling.

A user terminal according to a first embodiment and a second embodiment belongs to a group including a plurality of user terminals. The use terminal comprises: a controller configured to activate a semi-persistent scheduling, if receiving, from a base station, an activation instruction for the semi-persistent scheduling; and a receiver configured to use the semi-persistent scheduling to receive multicast data transmitted from the base station to the plurality of user terminals via a physical downlink shared channel.

In the first embodiment, the activation is instructed via the physical downlink control channel. If receiving the activation instruction again from the base station after receiving the activation instruction, the controller ignores the activation instruction.

In the second embodiment, the receiver receives a message including configuration information indicating a configuration of the semi-persistent scheduling from the base station. The controller determines, if activation notification information indicating that the semi-persistent scheduling is activated is included in the message, that the semi-persistent scheduling corresponding to the configuration information is activated.

In the second embodiment, the message is a broadcast RRC message, an individual RRC message, or a MAC message.

In the second embodiment, the user terminal comprising: a transmitter configured to transmit, to the base station, an interest notification about an interest in reception of the multicast data. The receiver receives, after transmitting the interest notification, the message including the activation notification information from the base station.

First Embodiment

Hereinafter, an embodiment in which contents of the present application apply to the LTE system being a mobile communication system based on the 3GPP standards will be described.

(LTE System Configuration)

Figure 1:
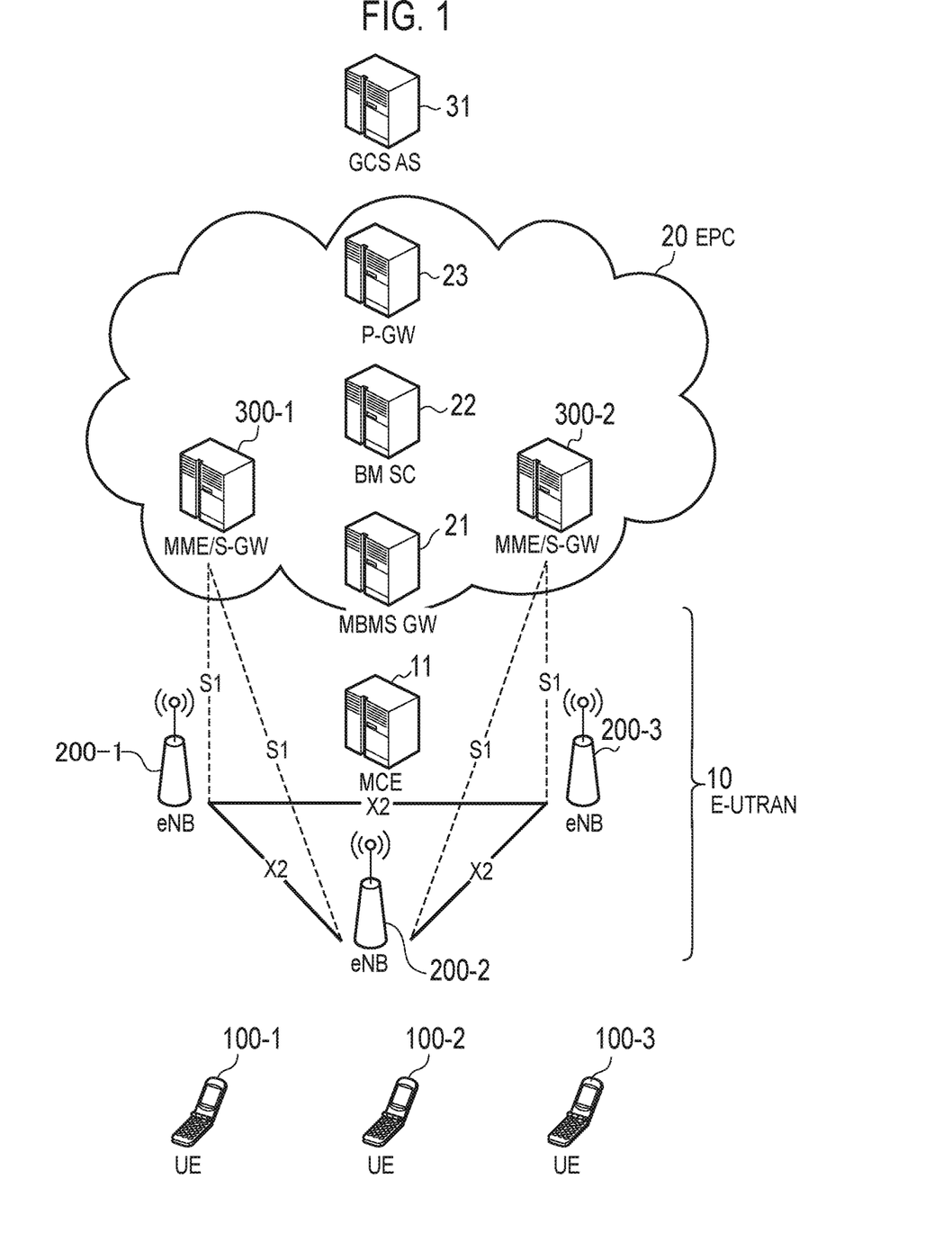
FIG. 1 is a configuration diagram of an LTE system according to a first embodiment and a second embodiment.

Firstly, a system configuration of the LTE system will be described. FIG. 1 is a configuration diagram of the LTE system.

As illustrated in FIG. 1, the LTE system comprises UEs (User Equipments) 100, E-UTRAN (Evolved-UMTS Terrestrial Radio Access Network) 10, and EPC (Evolved Packet Core) 20.

The UE 100 corresponds to the user terminal. The UE 100 is a mobile communication apparatus and performs radio communication with a cell (a serving cell). Configuration of UE 100 will be described later.

The E-UTRAN 10 corresponds to a radio access network. The E-UTRAN 10 includes a plurality of eNBs 200 (evolved Node-Bs). The eNB 200 corresponds to a base station. The eNBs 200 are connected mutually via an X2 interface. Configuration of eNB 200 will be described later.

The eNB 200 manages one cell or a plurality of cells and performs radio communication with the UE 100 that establishes a connection with the cell. The eNB 200 has a radio resource management (RRM) function, a routing function of user data (hereinafter, simply referred to as "data"), and a measurement control function for mobility control and scheduling and the like. The "cell" is used as a term indicating a minimum unit of a radio communication area, and is also used as a term indicating a function of performing radio communication with the UE 100.

The EPC 20 corresponds to a core network. The EPC 20 includes MMEs (Mobility Management Entities)/S-GWs (Serving-Gateways) 300. The MME performs various mobility controls and the like, for the UE 100. The S-GW performs transfer control of data. The eNB 200 is connected to the MME/S-GW 300 via an S1 interface. The E-UTRAN 10 and the EPC 20 constitute a network.

Further, the E-UTRAN 10 includes a Multi-Cell/Multicast Coordinating Entity (MCE) 11. The MCE 11 is connected to the eNB 200 via an M2 interface and to the MME 300 via an M3 interface. The MCE 11 performs management, allocation, and the like of an MBSFN radio resource.

The EPC 20 includes a Multimedia Broadcast Multicast Service Gateway (MBMS GW) 21. The MBMS GW 21 is connected to the eNB 200 via an M1 interface, to the MME 300 via an Sm interface, and to a BM-SC 22 (described later) via SG-mb and SGi-mb interfaces. The MBMS GW 21 performs data transmission and session control of an IP multicast for the eNB 200.

Further, the EPC 20 includes a Broadcast Multicast Service Center (BM-SC) 22. The BM-SC 22 is connected to the MBMS GW 21 via the SG-mb and SGi-mb interfaces and to the P-GW 23 via a SGi interface. The BM-SC 22 mainly performs management, assignment and the like of a Temporary Mobile Group Identity (TMGI).

Further, outside of the EPC 20 (that is, in the Internet), a Group Communication Service Application Server (GCS AS) 31 is provided. The GCS AS 31 is an application server for group communication. The GCS AS is connected to the BM-SC 22 via MB2-U and MB2-C interfaces, and to the P-GW 23 via the SGi interface. The GCS AS 31 performs group management, data distribution (including determining whether to use the MBMS or a unicast) and the like in the group communication.

Figure 2:
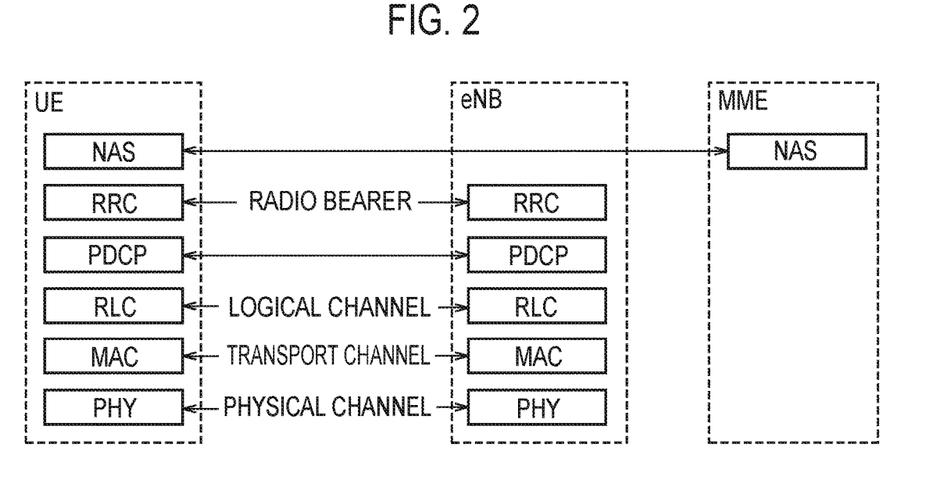
FIG. 2 is a protocol stack diagram of a radio interface according to the first embodiment and the second embodiment.

FIG. 2 is a protocol stack diagram of a radio interface in the LTE system. As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted through the physical channel.

The MAC layer performs preferential control of data, a retransmission process and the like by hybrid ARQ (HARQ), a random access procedure, and the like. Between the MAC layer of the UE 100 and the MAC layer of the eNB 200, data and control signal are transmitted via a transport channel. The MAC layer of the eNB 200 includes a scheduler for determining a transport format of an uplink and a downlink (a transport block size, a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane which treats the control signal. Between the RRC layer of the UE 100 and the RRC layer of the eNB 200, a message (an RRC message) for various types of configurations is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in a RRC connected state, and when the RRC connection is not established, the UE 100 is in an RRC idle state.

A NAS (Non-Access Stratum) layer positioned above the RRC layer performs session management and mobility management, for example.

Figure 3:
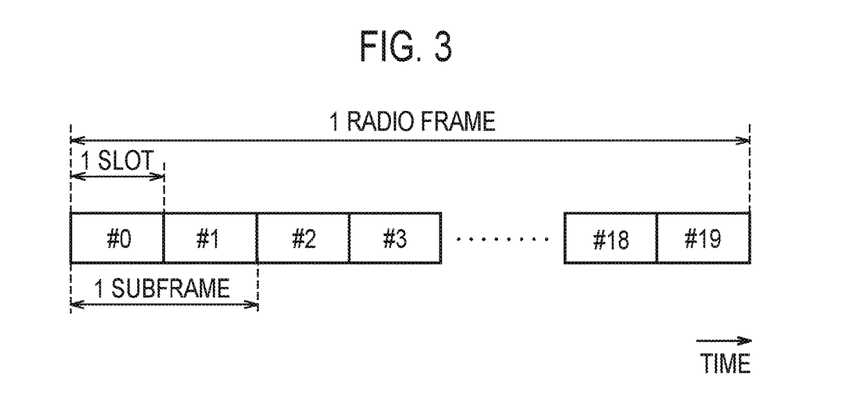
FIG. 3 is a configuration diagram of a radio frame according to the first embodiment and the second embodiment.

FIG. 3 is a configuration diagram of a radio frame used in the LTE system. In the LTE system, OFDMA (Orthogonal Frequency Division Multiple Access) is applied in a downlink, and SC-FDMA (Single Carrier Frequency Division Multiple Access) is applied in an uplink, respectively.

As illustrated in FIG. 3, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. A radio resource element (RE) is configured by one subcarrier and one symbol. Further, among radio resources (time-frequency resources) assigned to the UE 100, a frequency resource can be specified by a resource block and a time resource can be specified by a subframe (or slot).

In the downlink, an interval of several symbols at the head of each subframe is a region mainly used as a physical downlink control channel (PDCCH) for transmission of a downlink control signal. Furthermore, the remaining part of each subframe is a region mainly used as a physical downlink shared channel (PDSCH) for transmission of a downlink data. Furthermore, a downlink reference signal such as a cell specific reference signal (CRS) is allocated in each subframe.

In the uplink, both end portions in the frequency direction of each subframe are regions mainly used as a physical uplink control channel (PUCCH) for transmission of an uplink control signal. Furthermore, the center portion in the frequency direction of each subframe is a region that can be mainly used as a physical uplink shared channel (PUSCH) for transmission of an uplink data. Furthermore, an uplink reference signal such as a sounding reference signal (SRS) is arranged in each subframe, (Configuration of UE 100)

Figure 4:
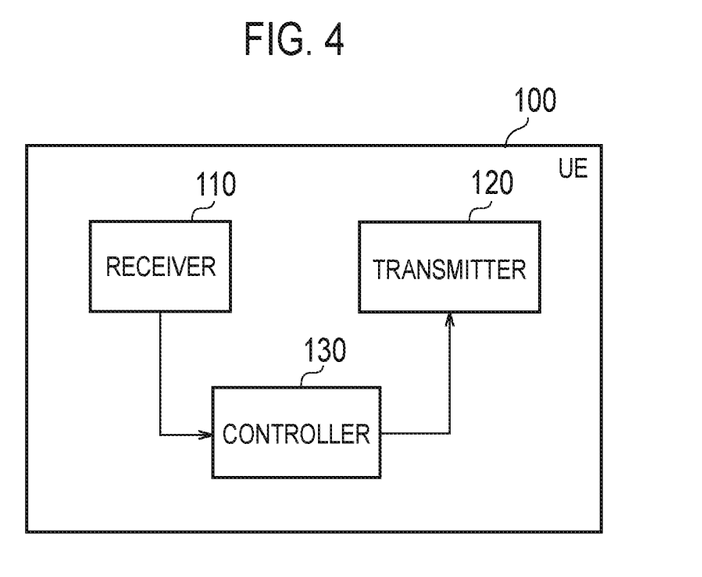
FIG. 4 is a block diagram of a UE according to the first embodiment and the second embodiment.

FIG. 4 is a block diagram illustrating a configuration of the UE 100 (user terminal). As illustrated in FIG. 4, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (received signal), and outputs the baseband signal to the controller 130.

The transmitter 120 performs various types of transmissions under the control of the controller 130. The transmitter 120 includes an antenna and a transmitter unit. The transmitter unit converts a baseband signal (transmission signal) output from the controller 130 into a radio signal, and transmits the radio signal from the antenna.

The controller 130 performs various types of controls in the UE 100. The controller 130 includes a processor and a memory. The memory stores a program executed by the processor, and information used for a process by the processor. The processor includes a baseband processor configured to perform modulation and demodulation, encoding and decoding and the like of the baseband signal, and a Central Processing Unit (CPU) configured to execute the program stored in the memory to perform various processes. The processor may include a codec configured to perform encoding and decoding on sound and video signals. The processor executes various types of processes described later, and various types of communication protocols described above.

The UE 100 may include a user interface and a battery. The user interface is an interface with a user carrying the UE 100, and for example, includes a display, a microphone, a speaker, various buttons and the like. The user interface receives an operation from a user and outputs a signal indicating a content of the operation to the controller 130. The battery accumulates power to be supplied to each block of the UE 100.

(Configuration of eNB 200)

Figure 5:
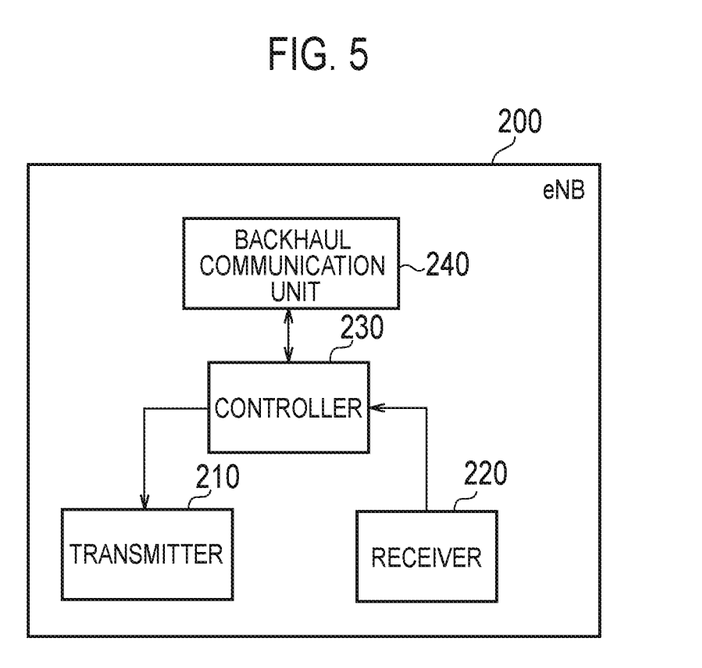
FIG. 5 is a block diagram of an eNB according to the first embodiment and the second embodiment.

FIG. 5 is a block diagram of the eNB 200 (base station). As illustrated in FIG. 5, the eNB 200 includes: a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmission signal) output from the controller 130 into a radio signal, and transmits the radio signal from the antenna.

The receiver 220 performs various types of receptions under the control of the controller 230. The receiver 220 includes an antenna and a receiver unit. The receiver unit converts a radio signal received by the antenna into a baseband signal (received signal), and outputs the baseband signal to the controller 230.

The controller 230 performs various types of controls in the eNB 200. The controller 230 includes a processor and a memory. The memory stores a program executed by the processor, and information used for a process by the processor. The processor includes a baseband processor configured to perform modulation and demodulation, encoding and decoding and the like of the baseband signal, and a Central Processing Unit (CPU) configured to execute the program stored in the memory to perform various processes. The processor executes various types of processes described later, and various types of communication protocols described above.

The backhaul communication unit 240 is connected to a neighboring eNB 200 via the X2 interface and is connected to the MME/S-GW 300 via the S1 interface. The backhaul communication unit 240 is used in communication performed on the X2 interface and communication performed on the S1 interface.

(Single Cell PTM Transmission)

Figure 6:
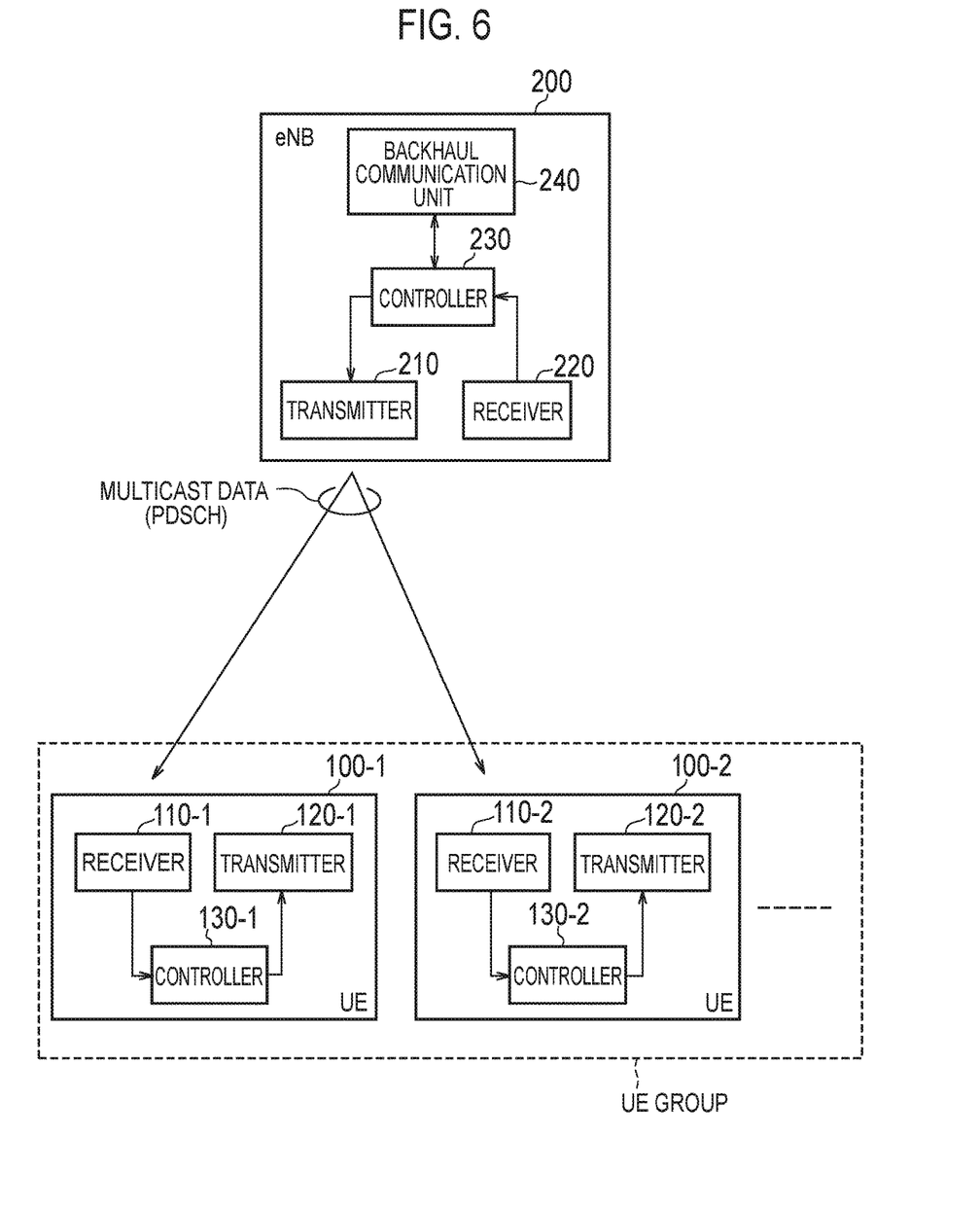
FIG. 6 is a diagram for describing an SCPTM according to the first embodiment and the second embodiment.

A single cell PTM transmission (SCPTM) will be described, below. The SCPTM realizes multicast transmission while increasing utilization efficiency of a radio resource. FIG. 6 is a diagram for describing an SCPTM related operation according to the first embodiment.

As illustrated in FIG. 6, in the SCPTM, the eNB 200 uses the PDSCH to transmit the multicast data by a single cell. That is, unlike the MBMS where multicast/broadcast transmission is applied per MBSFN area, in the SCPTM, the multicast transmission is applied per cell.

A plurality of UEs 100 (a UE 100-1, a UE 100-2, . . . ) configured to receive the identical multicast data constitute an UE group. Each UE 100 in the UE group is assigned a common group identifier. The group identifier is a Temporary Mobile Group Identity (TMGI) or a group RNTI, for example. The group identifier is assigned by the eNB 200 (or the MCE 11). Alternatively, the group identifier may be assigned by an entity of the core network (EPC 20). Alternatively, the group identifier may be assigned by an application server (GGS AS, for example).

A typical application to which the SCPTM is applied is a group communication service (mainly, a group call service). In the group communication service, the multicast transmission is applied to the downlink, and the unicast transmission is applied to the uplink.

(Semi-Persistent Scheduling)

The radio resource allocation on the PDSCH is typically a dynamic scheduling via the PDCCH. Specifically, for each allocation on a PDSCH in a subframe, scheduling information is transmitted to the UE 100 via a PDCCH in the subframe.

The scheduling information is information indicating a radio resource (resource block and the like) to be allocated and indicating a transport format. In the dynamic scheduling, the scheduling information transmitted via the PDCCH is used for one-time allocation.

However, scheduling may become complicated if such dynamic scheduling is applied to the SCPTM.

Therefore, in the first embodiment, instead of the dynamic scheduling, a semi-persistent scheduling (SPS) is applied to the SCPTM. The semi-persistent scheduling (SPS) will be described, below.

In the SPS, one piece of scheduling information is applied not only to one subframe but also to a large number of subsequent subframes. That is, by periodically applying a radio resource and a transport format indicated by the scheduling information, an overhead involved with transmission of the scheduling information is reduced.

The SPS is suitable for a service (such as a voice service) in which data to be transmitted is periodically generated and the data rate is constant. Therefore, the SPS is suitable for the group communication (SCPTM).

Configuration information of the SPS is transmitted by an RRC message from the eNB 200 to the UE 100. The configuration information of the SPS includes an SPS interval (semiPersistSchedInterval), for example. The configuration information of the SPS also includes an SPS C-RNTI (Cell-Radio Network Temporary ID) described later. On the other hand, an SPS activation instruction and scheduling information are transmitted from the eNB 200 to the UE 100 via the PDCCH.

Specifically, the PDCCH for activating the SPS (hereinafter, referred to as "SPS activation PDCCH") is identified by a special C-RNTI. The special C-RNTI is referred to as an SPS C-RNTI. The SPS C-RNTI is unique to the UE 100 and a unique SPS C-RNTI is assigned to each UE 100.

The eNB 200 masks the CRC of the SPS activation PDCCH with the SPS C-RNTI. Upon receiving (decoding) the SPS activation PDCCH from the SPS C-RNTI of the UE 100, the UE 100 stores scheduling information (a radio resource and a transport format) in the SPS activation PDCCH, and applies the scheduling information for each SPS interval set by the RRC message. It is noted that the eNB 200 is capable of activating the SPS as well as deactivating the SPS.

(Operation of eNB 200)

An operation of the eNB 200 according to the first embodiment will be described, below. In the first embodiment, the eNB 200 manages a cell in which a UE group including a plurality of UEs 100 exists.

If starting transmitting multicast data to a plurality of UEs 100, the controller 230 of the eNB 200 instructs, via the PDCCH, each of the plurality of UEs 100 to activate the SPS. The transmitter 210 of the eNB 200 transmits, by using the SPS, the multicast data to the plurality of UEs 100 via the PDSCH. The SPS is thus applied to the multicast transmission via the PDSCH (that is, the SCPTM) to realize efficient multicast transmission.

Here, a case is assumed where after starting transmitting the multicast data, a new UE 100 participates in the UE group. Such a UE 100 (hereinafter, referred to as "midway participation UE 100"), which is capable of receiving the configuration information of the SPS from the eNB 200 by an RRC message, is not capable of receiving the SPS activation PDCCH. In this case, the midway participation UE 100, which cannot activate the SPS, cannot receive the multicast data.

Therefore, in the first embodiment, the controller 230 of the eNB 200 instructs at least once, even after starting transmitting the multicast data, the UE 100 in the UE group to activate the SPS. For example, the controller 230 of the eNB 200 repeatedly instructs the activation. The controller 230 may regularly instruct the activation to the UE 100 in the group. That is, the SPS activation PDCCH is regularly transmitted to the UE group.

Here, it is preferable that the transmission interval of the SPS activation PDCCH satisfies a requested group communication setup time period. The group communication setup time period is a time period since the UE 100 determines to prefer starting the group communication until the group communication (mainly, reception) actually starts. For example, if the requested group communication setup time period is equal to or less than 500 ms, the specification can be satisfied as long as the SPS activation PDCCH is transmitted at least every 500 ms.

(Operation of UE 100)

An operation of the UE 100 according to the first embodiment will be described, below. In the first embodiment, the UE 100 belongs to a UE group including a plurality of UEs 100.

Upon reception of the activation instruction of the SPS (SPS activation PDCCH) from the eNB 200, the controller 130 of the UE 100 activates the SPS. The receiver 110 of the UE 100 uses the SPS to receive the multicast data transmitted via the PDSCH to the plurality of UEs 100 from the eNB 200. The SPS is thus applied to the multicast transmission via the PDSCH (that is, the SCPTM) to realize efficient multicast transmission.

Further, even if the UE 100 is a midway participation UE 100, when the eNB 200 repeatedly transmits the SPS activation PDCCH as described above, it is possible to receive the SPS activation PDCCH from the eNB 200.

However, if the eNB 200 repeatedly transmits the SPS activation PDCCH, the identical UE 100 may receive the SPS activation PDCCH a plurality number of times.

Therefore, in the first embodiment, upon reception of the SPS activation PDCCH from the eNB 200 again after receiving the SPS activation PDCCH, the controller 130 of the UE 100 ignores the SPS activation PDCCH. In this manner, when the second and subsequent SPS activation PDCCHs are ignored, it is possible to prevent generation of an unpredictable error even if the identical UE 100 receives the SPS activation PDCCH a plural number of times.

(An Example of Operation Sequence)

Figure 7:
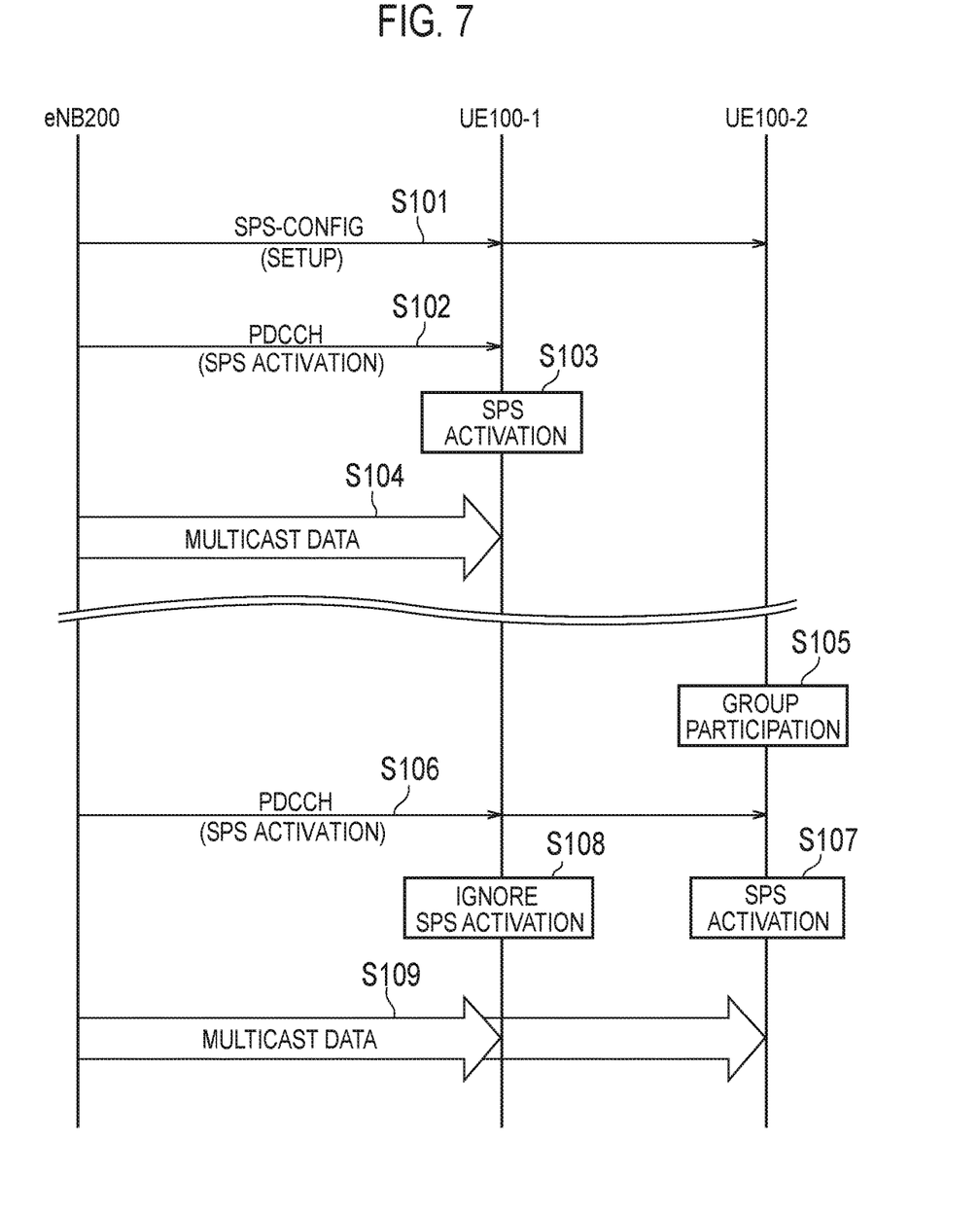
FIG. 7 is a diagram describing an example of an operation sequence according to the first embodiment.

An example of an operation sequence according to the first embodiment will be described, below. FIG. 7 is a diagram illustrating an example of the operation sequence according to the first embodiment. In the present sequence, a case is assumed where a plurality of UEs 100 including the UE 100-1 start the group communication by the SCPTM, and the UE 100-2 participate in the middle of the group communication.

As illustrated in FIG. 7, in step S101, the transmitter 210 of the eNB 200 transmits configuration information of the SPS (SPS-Config), by an RRC message, to each UE 100 (a UE 100-1 and a UE 100-2). The configuration information of the SPS includes an SPS interval (semiPersistSchedInterval), an SPS C-RNTI and the like. In each UE 100, the receiver 110 receives the configuration information of the SPS, and the controller 130 stores the configuration information of the SPS. It is noted that instead of the SPS C-RNTI, a group identifier (such as a group RNTI) may be used.

In step S102, the transmitter 210 of the eNB 200 transmits the SPS activation PDCCH (SPS activation) to the UE 100-1. It should be noted that at this point, the UE 100-2 has not participated in group communication. It is noted that the transmitter 210 of the eNB 200 may transmit the SPS activation PDCCH a plurality number of times before step S104 described later.

In step S103, in response to the receiver 110 of the UE 100-1 receiving the SPS activation PDCCH, the controller 130 of the UE 100-1 stores the scheduling information in the SPS activation PDCCH and activates the SPS.

In step S104, the transmitter 210 of the eNB 200 starts transmission of multicast data to the plurality of UEs 100 including the UE 100-1. Specifically, the transmitter 210 of the eNB 200 uses the SPS to transmit the multicast data to the plurality of UEs 100 via the PDSCH. The receiver 110 of the UE 100-1 receives the multicast data.

Thereafter, in step S105, the UE 100-2 participates in the group communication (UE group). Here, a group identifier may be assigned to the UE 100-2 from the network side.

It is noted that the UE 100-2 may receive the configuration information of the SPS in step S105 without receiving the configuration information of the SPS in step S101. In this case, the UE 100-2 may transmit to the eNB 200 an interest notification (GC Indication) described later to thereby receive the configuration information of the SPS from the eNB 200.

In step S106, the transmitter 210 of the eNB 200 transmits the SPS activation PDCCH to each UE 100 (the UE 100-1 and the UE 100-2). In each UE 100, the receiver 110 receives the SPS activation PDCCH.

In step S107, the controller 130 of the UE 100-2 stores the scheduling information in the SPS activation PDCCH and activates the SPS.

In step S108, the controller 130 of the UE 100-1 ignores the second and subsequent SPS activation PDCCHs.

In step S109, the transmitter 210 of the eNB 200 transmits the multicast data to the plurality of UEs 100 including the UE 100-1 and the UE 100-2. Specifically, the transmitter 210 of the eNB 200 uses the SPS to transmit the multicast data to the plurality of UEs 100 via the PDSCH. The receiver 110 of each UE 100 (the UE 100-1 and the UE 100-2) receives the multicast data.

Summary of First Embodiment

As described above, when the SPS is applied to the multicast transmission that passes through the PDSCH (that is, SCPTM), it is possible to realize more efficient multicast transmission.

Further, even after starting transmitting the multicast data, when the UE 100 in the UE group is repeatedly instructed to activate the SPS, it is possible for the midway participation UE 100 to activate the SPS to receive the multicast data.

Second Embodiment

A second embodiment will be described with a particular focus on a difference from the first embodiment.

The second embodiment is similar to the first embodiment in that the SPS is applied to the SCPTM. However, in the second embodiment, a solution to the midway participation UE 100 is different from that in the first embodiment.

(Operation of eNB 200)

An operation of the eNB 200 according to the second embodiment will be described, below.

As described above, the transmitter 210 of the eNB 200 transmits a message (RRC message) including configuration information (SPS-Config) about the configuration of the SPS. In the second embodiment, upon transmitting the message after starting transmitting multicast data, the controller 230 of the eNB 200 includes activation notification information indicating that the SPS is activated, into the message.

As a result, by receiving the configuration information of the SPS by the RRC message from the eNB 200, a midway participation UE 100 is capable of understanding that the SPS is activated. Therefore, the midway participation UE 100 is capable of activating the SPS to receive the multicast data.

The message is an individual RRC message. For example, the message is: an RRC Connection Reconfiguration message, an RRC Connection Reestablishment message, or an RRC Connection Setup message.

However, the message is not limited to the individual RRC message. The message may be a broadcast RRC message (system information message, for example) and a MAC message. It is noted that it is preferable that activation notification information includes scheduling information applied to the SPS (information on a radio resource and a transport format).

In the second embodiment, the receiver 220 of the eNB 200 may receive from the UE 100 an interest notification (GC Indication) related to an interest in reception of the multicast data. Upon reception of the interest notification after starting transmitting the multicast data, the transmitter 210 of the eNB 200 transmits a message including the activation notification information to the UE 100.

In this manner, when the eNB 200 designates the midway participation UE 100 and transmits the message including the activation notification information to the midway participation UE 100, it is possible to further ensure that the midway participation UE 100 receives the multicast data.

(Operation of UE 100)

An operation of the UE 100 according to the second embodiment will be described, below.

In the second embodiment, the receiver 110 of the UE 100 receives from the eNB 200 a message including configuration information (SPS-Config) indicating the configuration of SPS. If activation notification information indicating that the SPS is activated is included in the message, the controller 130 of the UE 100 determines that the SPS corresponding to the configuration information (SPS-Config) is activated. As a result, even if the UE 100 is a midway participation UE 100, it is possible to understand that the SPS is activated.

In the second embodiment, the transmitter 120 of the UE 100 may transmit an interest notification (GC Indication) about an interest in reception of the multicast data, to the eNB 200. The interest notification may include a group identifier corresponding to group communication (a UE group) in which the UE 100 is interested. After transmitting the interest notification, the receiver 110 of the UE 100 receives a message including the activation notification information, from the eNB 200. As a result, even if the UE 100 is a midway participation UE 100, it is possible to more reliably receive the multicast data.

(An Example of Operation Sequence)

Figure 8:
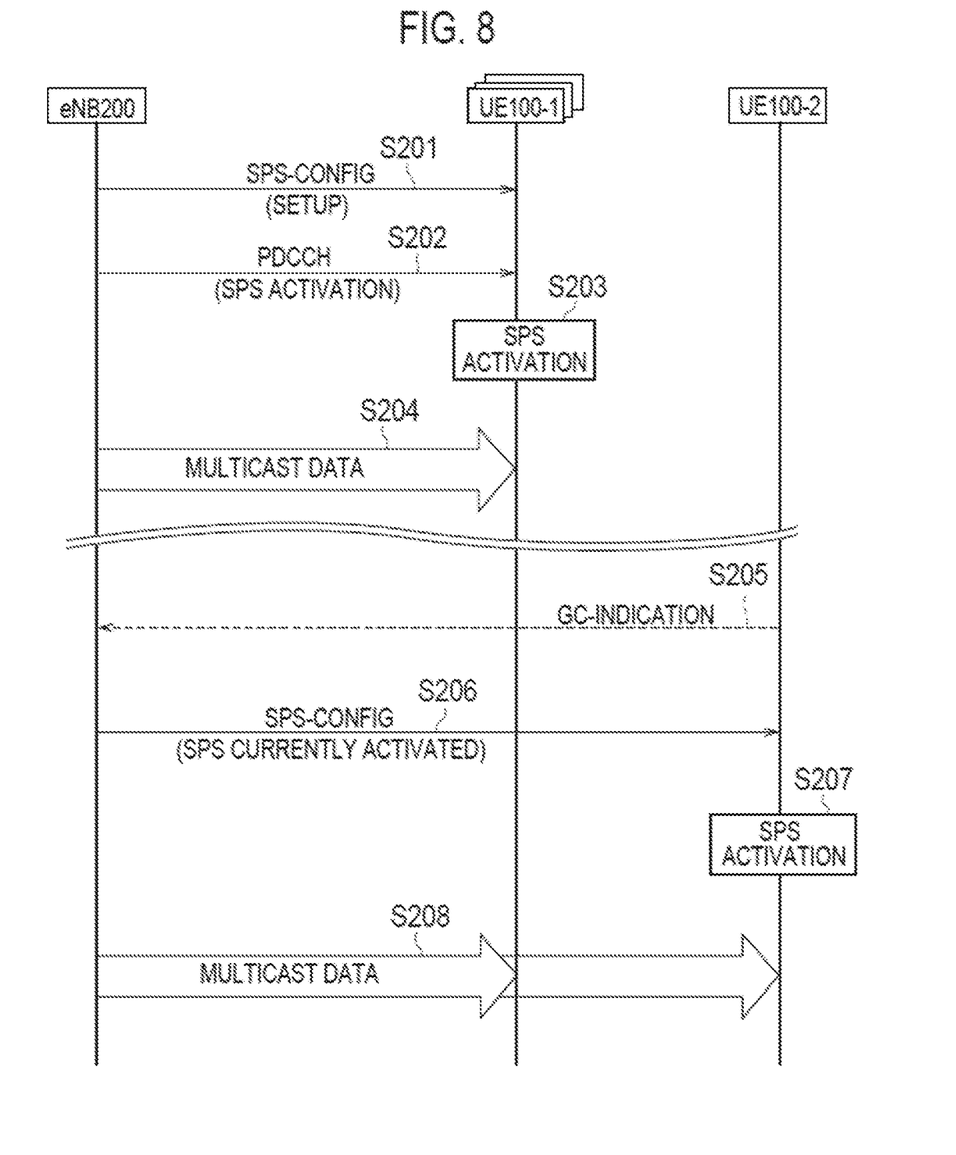
FIG. 8 is a diagram illustrating an example of an operation sequence according to the second embodiment.

An example of an operation sequence according to the second embodiment will be described, below. FIG. 8 is a diagram illustrating an example of an operation sequence according to the second embodiment. In the present sequence, a case is assumed where a plurality of UEs 100 including a plurality of the UEs 100-1 start the group communication by the SCPTM, and the UE 100-2 participate in the middle of the group communication.

As illustrated in FIG. 8, in step S201, the transmitter 210 of the eNB 200 transmits the configuration information of the SPS (SPS-Config), by an RRC message, to each of the plurality of the UEs 100-1. The configuration information of the SPS includes an SPS interval (semiPersistSchedInterval), an SPS C-RNTI and the like. In each of the plurality of the UEs 100-1, the receiver 110 receives the configuration information of the SPS and the controller 130 stores the configuration information of the SPS.

In step S202, the transmitter 210 of the eNB 200 transmits the SPS activation PDCCH (SPS activation) to each of the plurality of the UEs 100-1. It should be noted that at this point, the UE 100-2 has not participated in group communication.

In step S203, in response to the receiver 110 of each of the plurality of the UEs 100-1 receiving the SPS activation PDCCH, the controller 130 of each of the plurality of the UEs 100-1 stores the scheduling information in the SPS activation PDCCH and activates the SPS.

In step S204, the transmitter 210 of the eNB 200 starts the transmission of the multicast data to the plurality of UEs 100-1. Specifically, the transmitter 210 of the eNB 200 uses the SPS to transmit the multicast data to the plurality of UEs 100-1 via the PDSCH. The receiver 110 of each of the plurality of the UEs 100-1 receives the multicast data.

Thereafter, in step S205, the UE 100-2 participates in the group communication (UE group). Here, a group identifier may be assigned to the UE 100-2 from the network side. Further, the transmitter 120 of the UE 100-2 may transmit the interest notification (GC Indication) to the eNB 200 (step S205, which is performed later than step S202 for instructing each of the plurality of the UEs 100-1 to activate the SPS). In step S205, a receiver of the eNB 200 receives, from the UE 100-2, the interest notification. The interest notification is about an interest in receiving the multicast data.

In step S206, the transmitter 210 of the eNB 200 transmits the configuration information of the SPS (SPS-Config) and the activation notification information (SPS currently activated), by the RRC message, to the UE 100-2, if receiving the interest notification after instructing each of the plurality of UEs 100-1 to activate the SPS. The configuration information is about a configuration of the SPS, and the activation notification information indicates that the SPS is activated at the plurality of UEs 100-1. In the UE 100-2, in step S206, which is performed later than step 205 for transmitting the interest notification, the receiver 110 receives the configuration information of the SPS and the activation notification information, and the controller 130 stores the configuration information of the SPS. The activation notification information includes the SPS scheduling information (information on the radio resource and the transport format).

In step S207, the controller 130 of the UE 100-2 determines that the SPS corresponding to the configuration information is activated, and then activates the SPS if the SPS corresponding to the configuration information is not activated, based on the configuration information of the SPS and the activation notification information.

In step S208, the transmitter 210 of the eNB 200 transmits the multicast data to a plurality of UEs 100 including the pluarlity of UEs 100-1 and the UE 100-2. Specifically, the transmitter 210 of the eNB 200 uses the SPS to transmit the multicast data to the plurality of UEs 100 via the PDSCH. The receiver 110 of each of UEs 100 receives the multicast data.

Summary of Second Embodiment

As described above, upon transmitting the message after starting transmitting the multicast data, the eNB 200 includes, into the message, the activation notification information indicating that the SPS is activated. As a result, the midway participation UEs 100 that received the message is capable of activating the SPS to receive the multicast data.

Other Embodiments

The first embodiment and the second embodiment described above may be separately and independently implemented. The first embodiment and the second embodiment may be combined to be implemented.

In the above-described first embodiment and second embodiment, an LTE system is exemplified as the mobile communication system. However, the content of the present application is not limited to the LTE system. The content of the present application may be applied to systems other than the LTE system.

It is noted that the entire content of U.S. Provisional Application No. 62/110,045 (filed on Jan. 30, 2015) is incorporated in the present specification by reference.

The invention claimed is:

1. A base station configured to manage a cell in which a group including a plurality of first user terminals and a second user terminal, which is different from the plurality of first user terminals, exists, comprising:
   a controller configured to instruct, if starting transmission of multicast data to the plurality of first user terminals, each of the plurality of first user terminals to activate a semi-persistent scheduling; and
   a transmitter configured to use the semi-persistent scheduling to transmit the multicast data to the plurality of first user terminals via a physical downlink shared channel, wherein
   the transmitter is configured to
   after instructing each of the plurality of first user terminals to perform the activation of the semi-persistent scheduling, transmit a message including configuration information about a configuration of the semi-persistent scheduling and activation notification information indicating that the semi-persistent scheduling is activated, to the second user terminal.

2. The base station according to claim 1, wherein the activation is instructed via the physical downlink control channel, and the controller is configured to repeatedly instruct a user terminal in the group to perform the activation.

3. The base station according to claim 1, wherein the controller is configured to instruct a user terminal in the group to perform the activation, even after starting transmitting the multicast data.

4. The base station according to claim 2, wherein the controller is configured to regularly instruct the user terminal in the group to perform the activation.

5. The base station according to claim 1, wherein the message is a broadcast RRC message, an individual RRC message, or a MAC message.

6. A base station configured to manage a cell in which a group including a plurality of first user terminals and a second user terminal, which is different from the plurality of first user terminals, exists, the base station comprising:

a controller configured to instruct, if starting transmission of multicast data to the plurality of first user terminals, each of the plurality of first user terminals to activate a semi-persistent scheduling;

a transmitter configured to use the semi-persistent scheduling to transmit the multicast data to the plurality of first user terminals via a physical downlink shared channel; and a receiver, wherein the receiver is configured to receive, from the second user terminal, an interest notification about an interest in receiving the multicast data, after instructing each of the plurality of first user terminals to activate the semi-persistent scheduling, and the transmitter is configured to transmit, to the second user terminal, a message including configuration information about a configuration of the semi-persistent scheduling and activation notification information indicating that the semi-persistent scheduling is activated, if receiving the interest notification after instructing each of the plurality of first user terminals to activate the semi-persistent scheduling.

7. A second user terminal belonging to a group including a plurality of first user terminals and the second user terminal, which is different from the plurality of first user terminals, the second user terminal comprising:

a transmitter configured to transmit, to a base station, an interest notification about an interest in reception of multicast data, after an activation instruction for semi-persistent scheduling is sent to each of the plurality of first user terminals by the base station;

a receiver configured to receive, from the base station, after transmitting the interest notification, a message including configuration information indicating a configuration of the semi-persistent scheduling and activation notification information indicating that the semi-persistent scheduling is activated; and a controller configured to, based on the configuration information and the activation notification, activate the semi-persistent scheduling at the second user terminal, wherein the receiver is configured to use the semi-persistent scheduling to receive the multicast data transmitted from the base station to the plurality of first user terminals and the second user terminal, via a physical downlink shared channel.

8. The user terminal according to claim 7, wherein the message is a broadcast RRC message, an individual RRC message, or a MAC message.

\* \* \* \* \*